US012403696B2

(12) United States Patent
Yang

(10) Patent No.: US 12,403,696 B2
(45) Date of Patent: Sep. 2, 2025

(54) TRAP DEVICE AND SUBSTRATE PROCESSING APPARATUS COMPRISING THE SAME

(71) Applicant: SEMES CO., LTD., Chungcheongnam-do (KR)

(72) Inventor: Jin Woo Yang, Gyeonggi-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 32 days.

(21) Appl. No.: 17/941,009

(22) Filed: Sep. 8, 2022

(65) Prior Publication Data

US 2023/0138692 A1 May 4, 2023

(30) Foreign Application Priority Data

Oct. 29, 2021 (KR) ........................ 10-2021-0147339

(51) Int. Cl.
*B41J 2/17* (2006.01)
*B41J 2/045* (2006.01)

(52) U.S. Cl.
CPC ......... *B41J 2/1714* (2013.01); *B41J 2/04583* (2013.01)

(58) Field of Classification Search
None
See application file for complete search history.

(56) References Cited

U.S. PATENT DOCUMENTS 3,834,124 A * 9/1974 Ichikawa ........... B01D 19/0031 96/219
4,906,260 A * 3/1990 Emheiser ........... B01D 19/0031 95/279
2015/0097903 A1* 4/2015 Iijima ...................... B41J 2/175 347/102
2015/0104581 A1* 4/2015 Komatsubara ......... B01D 29/15 427/425
2017/0313095 A1* 11/2017 Bayona ................ B41J 2/17596
2020/0070196 A1* 3/2020 Kamimura .............. B05B 14/00
2023/0026405 A1* 1/2023 Kishida .................... B41J 2/125
2023/0136205 A1 5/2023 Fukuda

FOREIGN PATENT DOCUMENTS

JP 2004-066143 3/2004
JP 3152963 8/2009
JP 5671396 2/2015
(Continued)

OTHER PUBLICATIONS

English translation for JP2015192033.*
(Continued)

*Primary Examiner* — Charles Capozzi
(74) *Attorney, Agent, or Firm* — WOMBLE BOND DICKINSON (US) LLP

(57) ABSTRACT

The present disclosure provides a substrate processing apparatus capable of stably controlling a meniscus position. The substrate processing apparatus comprises a head unit configured to discharge a medical fluid; a reservoir configured to store the medical fluid and supply the medical fluid to the head unit; a pressure control unit configured to control pressure in the reservoir; and a trap unit disposed between the reservoir and the pressure control unit and configured to trap a mist generated by the reservoir.

9 Claims, 10 Drawing Sheets

(56) References Cited

FOREIGN PATENT DOCUMENTS

| | | |
|---|---|---|
| JP | 2015-192033 | 11/2015 |
| JP | 2021-126802 | 9/2021 |
| KR | 10-2012-0020770 | 3/2012 |
| KR | 10-2015-0073597 | 7/2015 |

OTHER PUBLICATIONS

Office Action dated Sep. 21, 2023 for Korean Patent Application No. 10-2021-0147339 and its English machine translation by Google Translate.

* cited by examiner

TRAP DEVICE AND SUBSTRATE PROCESSING APPARATUS COMPRISING THE SAME

CROSS-REFERENCE TO RELATED APPLICATION

This application claims priority from Korean Patent Application No. 10-2021-0147339 filed on Oct. 29, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a trap device and a substrate processing apparatus comprising the same.

2. Description of the Related Art

In order to manufacture display devices such as an LCD panel, a PDP panel and an LED panel, printing is performed on a substrate using an inkjet head. A meniscus position in a nozzle of the inkjet head is one of the central elements that determine injection characteristics of ink. The meniscus position may be controlled by a meniscus pressure controller (MPC).

SUMMARY

Aspects of the present disclosure provide a substrate processing apparatus capable of stably controlling a meniscus position without malfunction.

Aspects of the present disclosure also provide a trap device used in a substrate processing apparatus.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

TECHNICAL SOLUTION

According to an aspect of the present disclosure, there is provided a substrate processing apparatus, comprising: a head unit configured to discharge a medical fluid; a reservoir configured to store the medical fluid and supply the medical fluid to the head unit; a pressure control unit configured to control pressure in the reservoir; and a trap unit disposed between the reservoir and the pressure control unit and configured to trap a mist generated by the reservoir.

According to another aspect of the present disclosure, there is provided a substrate processing apparatus, comprising: a stage configured to process a substrate: a gantry disposed to cross the stage; and an inkjet head module installed in the gantry and configured to discharge ink to the substrate, wherein the inkjet head module comprises: a head unit configured to discharge the ink; a reservoir configured to store the ink and supply the ink to the head unit; a pressure control unit configured to control pressure in the reservoir; and a trap unit disposed between the reservoir and the pressure control unit and configured to trap a mist generated by the reservoir, wherein the trap unit comprises: a body; a first line installed in the body, connected to the reservoir and extending in a first direction; a second line installed in the body, connected to the pressure control unit and extending in a second direction; a third line installed to penetrate the first line and the second line from an upper surface of the body; and a trap layer installed on an inner wall of the first line or an inner wall of the second line and configured to trap the mist.

According to an aspect of the present disclosure, there is also provided a trap device comprising: a body; a first line installed in the body, connected to an inlet and extending in one direction; a second line installed in the body, connected to an outlet and extending in the one direction; a third line installed to penetrate the first line and the second line from an upper surface of the body; and a trap layer installed on an inner wall of the first line or an inner wall of the second line and configured to trap a mist.

Specific details of other embodiments are included in the detailed description and the drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
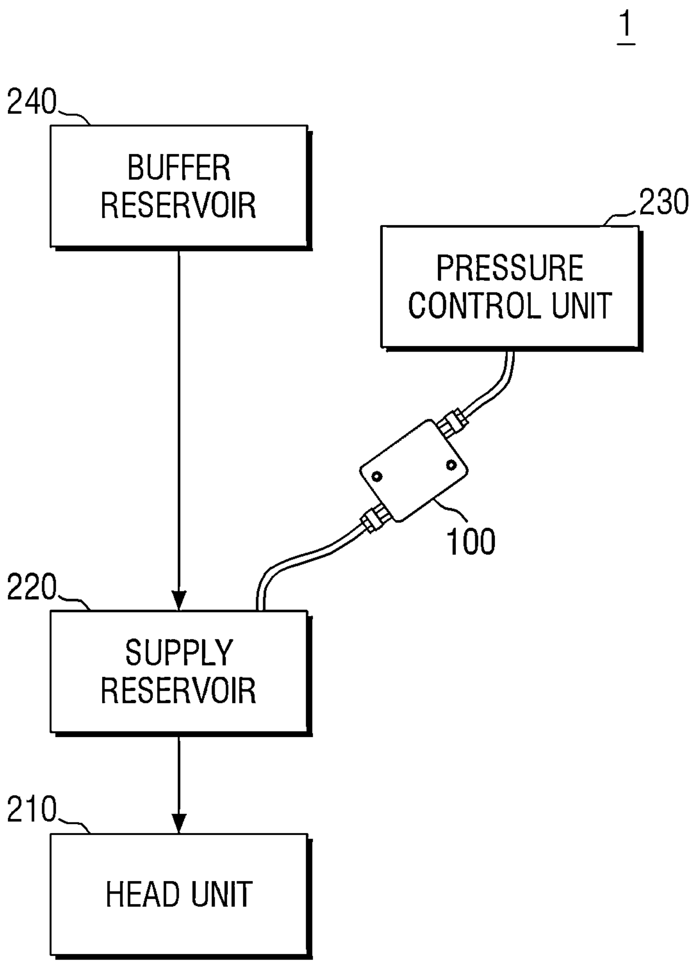
FIG. 1 is a block diagram illustrating a substrate processing apparatus according to some embodiments of the present disclosure.

Hereinafter, embodiments of the present disclosure will be described with reference to the attached drawings. The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. Like numbers refer to like elements throughout the description of the figures.

The spatially relative terms "below," "beneath," "lower," "above," "upper" may be used to easily describe the correlation of a device or components with other devices or components. Spatially relative terms are to be understood as including terms in different directions of the device in use or operation in addition to the directions shown in the figures. For example, when flipping a device shown in the figure, a device described as "below" or "beneath" of another device may be placed "above" of another device. Thus, the exemplary term "below" can encompass both an orientation of above and below. The device can also be oriented in other directions, so that spatially relative terms can be interpreted according to orientation.

Although the first, second, etc. are used to describe various elements, components and/or sections, these elements, components and/or sections are of course not limited by these terms. These terms are only used to distinguish one element, component or section from another element, component or section. Therefore, the first device, the first component, or the first section mentioned below may be a second device, a second component, or a second section within the technical spirit of the present disclosure.

Hereinafter, preferred embodiments according to the present disclosure are described in detail with reference to the accompanying drawings. The same or similar elements are assigned the same reference numerals irrespective of their reference numerals, and a redundant description thereof is omitted.

Figure 2:
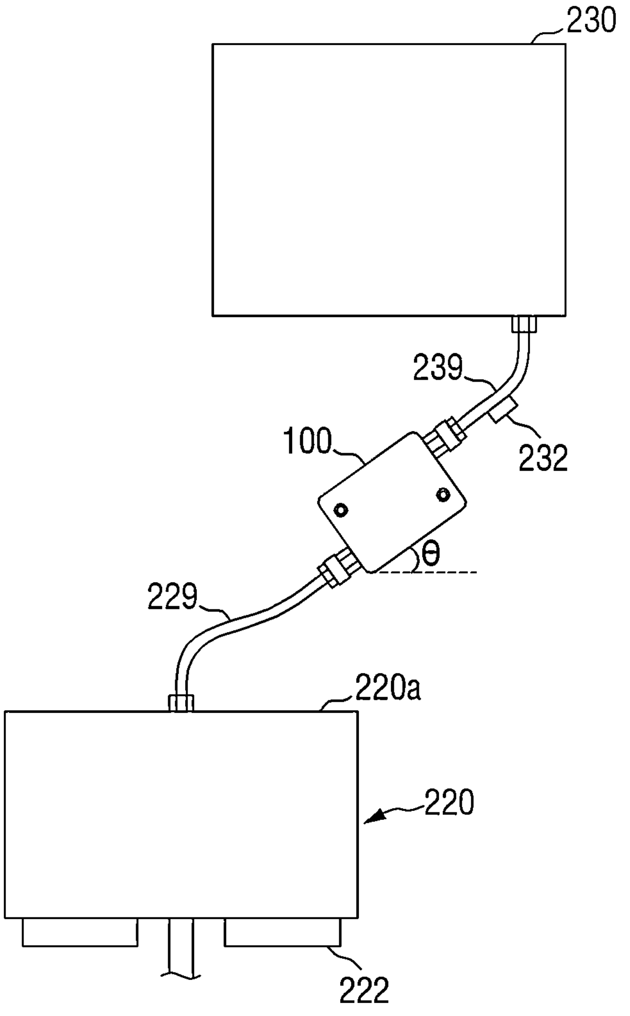
FIG. 2 is a view illustrating in detail the supply reservoir, the trap unit, and the pressure control unit of FIG. 1.

FIG. 1 is a block diagram illustrating a substrate processing apparatus according to some embodiments of the present disclosure. FIG. 2 is a view illustrating in detail the supply reservoir, the trap unit, and the pressure control unit of FIG. 1.

First, referring to FIG. 1, a substrate processing apparatus 1 according to some embodiments of the present disclosure includes a head unit 210, a supply reservoir 220, a pressure control unit 230, a buffer reservoir 240, and a trap unit 100.

The head unit 210 receives a medical fluid from the supply reservoir 220 and discharges the received medical fluid onto the substrate. The head unit 210 includes a plurality of nozzles configured to discharge the medical fluid onto the substrate. The medical fluid supplied to the head unit 210 may be supplied by gravity from the supply reservoir 220 disposed in an upper portion of the head unit 210, but the present disclosure is not limited thereto.

The supply reservoir 220 is provided in the upper portion of the head unit 210. The supply reservoir 220 receives and stores the medical fluid from the buffer reservoir 240 disposed in an upper portion of the supply reservoir 220.

The pressure control unit 230 is connected to the supply reservoir 220 and controls pressure in the supply reservoir 220. The pressure control unit 230 may be a meniscus pressure controller (MPC).

The pressure control unit 230 supplies positive pressure and/or negative pressure into the supply reservoir 220 to control the pressure in the supply reservoir 220.

Specifically, the pressure control unit 230 may control the supply of the medical fluid from the supply reservoir 220 to the head unit 210 by controlling the pressure in the supply reservoir 220. For example, the supply of the medical fluid from the supply reservoir 220 to the head unit 210 is performed by gravity, and the suspension of the medical fluid supply is performed by allowing the pressure control unit 230 to supply the negative pressure into the supply reservoir 220.

Furthermore, the pressure control unit 230 controls the medical fluid to be in a concave meniscus state (i.e., a state where a surface of the medical fluid increases in the center relative to the surroundings due to a surface tension) in a plurality of nozzle ends provided in the head unit 210. When the medical fluid is in the concave meniscus state, the medical fluid does not flow down from the end of the nozzle, which can reduce substrate defects.

Meanwhile, the buffer reservoir 240 receives and stores the medical fluid from an external medical fluid supply source (not shown), and supplies the received medical fluid to the supply reservoir 220. When the medical fluid is supplied from the medical fluid supply source (not shown) to the buffer reservoir 240, the inside of the medical fluid supply source is pressurized. When the medical fluid supply source is directly connected to the supply reservoir 220, the internal pressure of the supply reservoir 220 is affected by the medical fluid supply source. However, since there is the buffer reservoir 240 between the medical fluid supply source and the supply reservoir 220, the influence of the medical fluid supply source on the supply reservoir 220 may be blocked.

The trap unit 100 is installed between the supply reservoir 220 and the pressure control unit 230. The trap unit 100 traps a mist generated in the supply reservoir 220.

Herein, referring to FIG. 2, a heater 222 is installed in the supply reservoir 220 so as to control the temperature of the medical fluid. Although FIG. 2 illustrates that the heater 222 is installed on the bottom surface of the supply reservoir 220, the present disclosure is not limited thereto. In other words, the heater 222 may also be installed on a sidewall or an upper surface of the supply reservoir 220.

The pressure control unit 230 is connected to the supply reservoir 220 through tubes 229 and 239. An interlock sensor 232 is installed in the tube 239. The interlock sensor 232 may be, for example, a liquid detection sensor. The pressure control unit 230 is vulnerable to liquid (i.e., medical fluid, etc.). When the pressure control unit 230 is exposed to liquid, malfunction may occur or meniscus control may become inaccurate. Accordingly, when the liquid is detected in the interlock sensor 232 before the liquid reaches the pressure control unit 230, an interlock for stopping the operation occurs.

Meanwhile, the trap unit 100 is disposed between the supply reservoir 220 and the pressure control unit 230. In other words, the trap unit 100 is connected to the supply reservoir 220 through the tube 229 and is connected to the pressure control unit 230 through the tube 239.

As described above, since the heater 222 is installed in the supply reservoir 220, mist (i.e., medical fluid mist or vaporized medical fluid) may be generated by the heating operation of the heater 222. When the mist is delivered to the pressure control unit 230, this may cause malfunction of the pressure control unit 230. Alternatively, the installation purpose of the interlock sensor 232 is to detect the occurrence of overflow; however, when the mist is detected by the interlock sensor 232, the interlock may take place. Although the medical fluid has not overflown from the supply reservoir 220, the interlock sensor 232 may recognize that the medical fluid has overflown (i.e., a malfunction of the interlock sensor 232 occurred).

Accordingly, the trap unit 100 is disposed below the interlock sensor 232 to block the mist so that the mist generated by the supply reservoir 220 is not delivered to the interlock sensor 232 or the pressure control unit 230.

The trap unit 100 is inclined at an acute angle (θ) with respect to an upper surface 220*a* of the supply reservoir 220. As will be described below, a contact surface between the mist and the trap unit 100 is increased so that the mist may be more trapped in the trap unit 100. Furthermore, when the liquefied medical fluid from the trap unit 100 drops to the supply reservoir 220, it flows slowly along the inclined tube 229 to prevent bubbles from occurring in the supply reservoir 220.

Hereinafter, various embodiments of the trap unit 100 will be described with reference to FIGS. 3 to 7.

Figure 3:
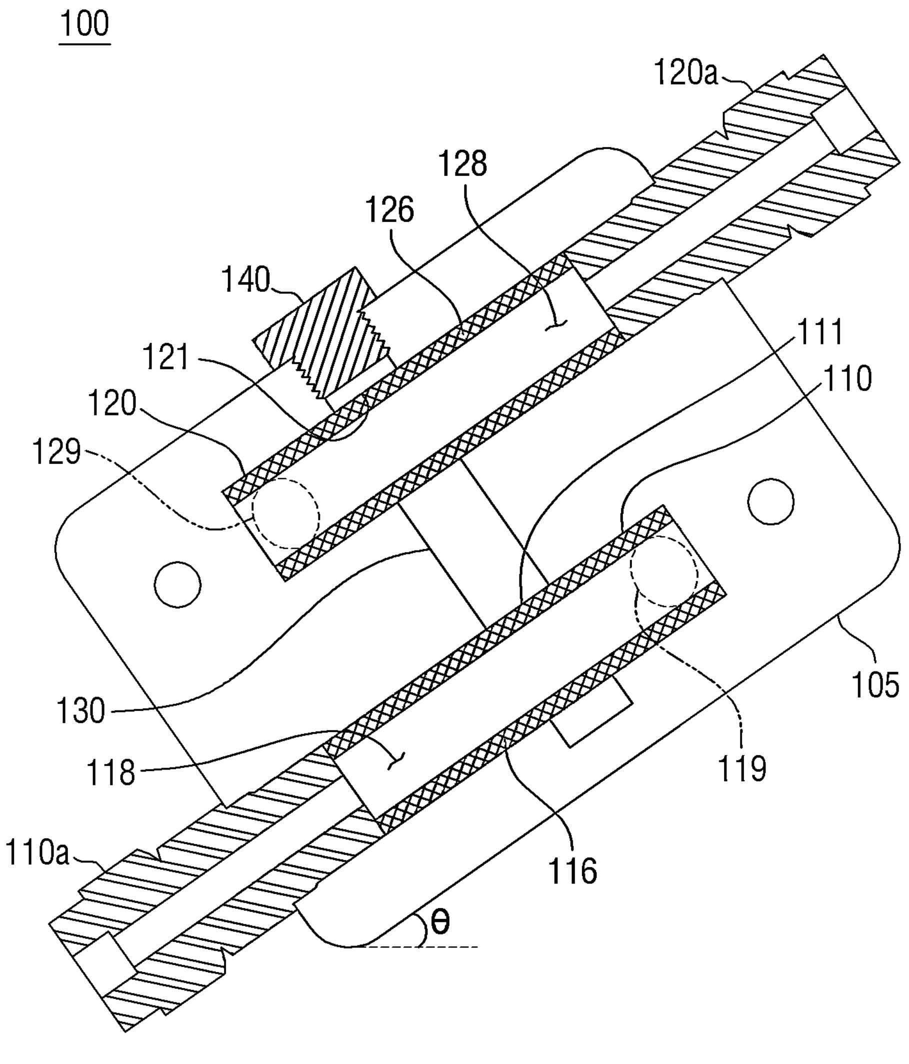
FIG. 3 is a cross-sectional view illustrating a trap unit according to a first embodiment of the present disclosure.
Figure 4:
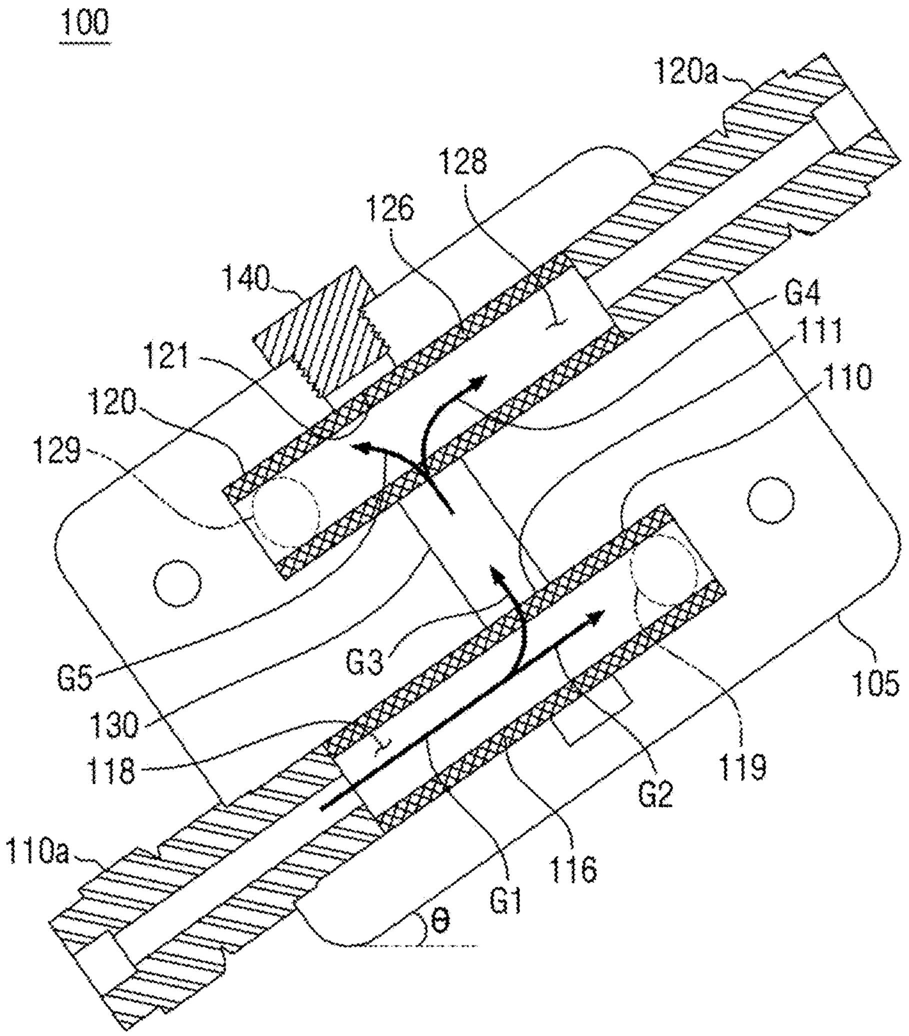
FIG. 4 is a diagram illustrating a mist motion in the trap unit of FIG. 3.

FIG. 3 is a cross-sectional view illustrating a trap unit according to a first embodiment of the present disclosure. FIG. 4 is a diagram illustrating a mist motion in the trap unit of FIG. 3.

First, referring to FIG. 3, the trap unit 100 according to a first embodiment of the present disclosure includes a body 105, a first line 110, a second line 120, a third line 130, a first trap layer 116, and a second trap layer 126.

The body 105 may be made of, for example, metal, and the first line 110, the second line 120, and the third line 130 are installed in the body 105.

The first line 110 is connected to the supply reservoir 220 (see FIG. 2) and extends in a first direction. The first trap layer 116 configured to trap the mist is installed on an inner wall of the first line 110. The first trap layer 116 may include, for example, at least one of a mesh structure, a membrane structure and a filter structure, but the present disclosure is not limited thereto. The mesh structure may be made of metal such as SUS. The membrane structure and the filter structure may contain mist including pores inside, but the present disclosure is not limited thereto.

The second line 120 is connected to the pressure control unit 230 and extends in a second direction. As illustrated in the drawings, the first direction and the second direction may be substantially the same direction (i.e., a parallel direction), but the present disclosure is not limited thereto. The second trap layer 126 configured to trap mist is installed on an inner wall of the second line 120. The second trap layer 126 may include, for example, at least one of the mesh structure, the membrane structure and the filter structure, but the present disclosure is not limited thereto.

The third line 130 connects the first line 110 to the second line 120. For example, the third line 130 may be installed to penetrate the first line 110 and the second line 120 from an upper surface of the body 105. A cover 140 may be installed on the upper surface of the body 105 to open or seal one side of the third line 130. The cover 140 may be, for example, a screw, but the present disclosure is not limited thereto.

The first line 110 includes a first connector 111 connected to the third line 130. The first line 110 includes an inlet 118 disposed in a first side (e.g., the left side) centered on the first connection port 111 and a first buffer region 119 disposed in a second side (e.g., the right side) centered thereon. A first connection member 110*a* for connection with the tube 229 is installed in the inlet 118. The first connection member 110*a* may be inserted/fixed in the body 105.

Similarly, the second line 120 includes a second connector 121 connected to the third line 130. The second line 120 includes an outlet 128 disposed in the second side (e.g., the right side) centered on the second connection port 121 and a second buffer region 129 disposed in the first side (e.g., the left side) centered thereon. A second connection member 120*a* for connection with the tube 239 is installed in the outlet 128. The second connection member 120*a* may be inserted/fixed in the body 105.

In this way, the first line 110, the second line 120, and the third line 130 are configured so as to make the movement path of the mist as long as possible. When the movement path of the mist is lengthened, the mist can be liquefied in the trap unit 100 while the mist moves along the movement path.

Herein, the mist motion in the trap unit 100 will be described with reference to FIG. 4. For example, the first trap layer 116 and the second trap layer 126 are mesh structures made of metal SUS.

The mist generated from the supply reservoir 220 is inserted into the trap unit 100 via the first connection member 110*a* and the inlet 118 (see reference mark G1).

A part of the mist inserted into the trap unit 100 increases to the first buffer region 119 and is trapped in the first buffer region 119 (see reference mark G2). The mist trapped in the first buffer region 119 is liquefied while it is in contact with the first trap layer 116 with a relatively low temperature, and the liquefied medical fluid flows downwards along the extending direction of the first line 110 and then comes out of the inlet 118.

In addition, a part of the mist inserted into the trap unit 100 reaches the third line 130 (see reference mark G3). To ensure that the mist can move along the third line 130, the mist needs to pass through the first trap layer 116 with a relatively low temperature. In the process of passing through the first trap layer 116, the temperature of the mist may decrease or the liquefaction of the mist may occur.

In addition, a part of the mist inserted into the third line 130 reaches the second line 120 (see reference marks G4 and G5). To ensure that the mist can move along the second line 120, the mist needs to pass through the second trap layer 126 with a relatively low temperature. In the process of passing through the second trap layer 126, the temperature of the mist may decrease or the liquefaction of the mist may occur.

A part of the mist reaching the second line 120 goes to the second buffer region 129 and is trapped in the second buffer region 129 (see reference mark G5). The mist trapped in the second buffer region 129 may be liquefied while it is in contact with the second trap layer 126 with a relatively low temperature, and the liquefied medical fluid may be collected in the second buffer region 129 or flow through the third line 130.

A part of the mist reaching the second line 120 may move in the direction of the outlet 128 (see reference mark G4). However, the mist is continuously in contact with the trap layers 116 and 126 with a relatively low temperature as it passes through a long movement path. Therefore, the mist does not reach the outlet 128 and is mostly liquefied.

Meanwhile, the liquefied medical fluid remains in the trap unit 100 or is moved to the supply reservoir 220 through the tube 229.

When the cover 140 is opened, one side of the third line 130 extending to the upper surface of the body 105 is opened. Accordingly, the medical fluid remaining in the trap unit 100 may be extracted through the third line 130 extending to the upper surface of the body 105.

In addition, the trap unit 100 is inclined at an acute angle (θ) with respect to the upper surface 220*a* of the supply reservoir 220. Accordingly, the tube 229 configured to connect the trap unit 100 and the supply reservoir 220 is also inclined. As a result, the liquefied medical fluid flows slowly along the inclined tube 229 and drops into the supply reservoir 220. Therefore, bubbles do not occur in the supply reservoir 220.

Accordingly, the trap unit 100 blocks the mist so that the mist generated in the supply reservoir 220 is not delivered to the interlock sensor 232 or the pressure control unit 230.

Therefore, it is possible to prevent malfunction of the interlock sensor 232, and to enable the pressure control unit 230 to stably operate.

Figure 5:
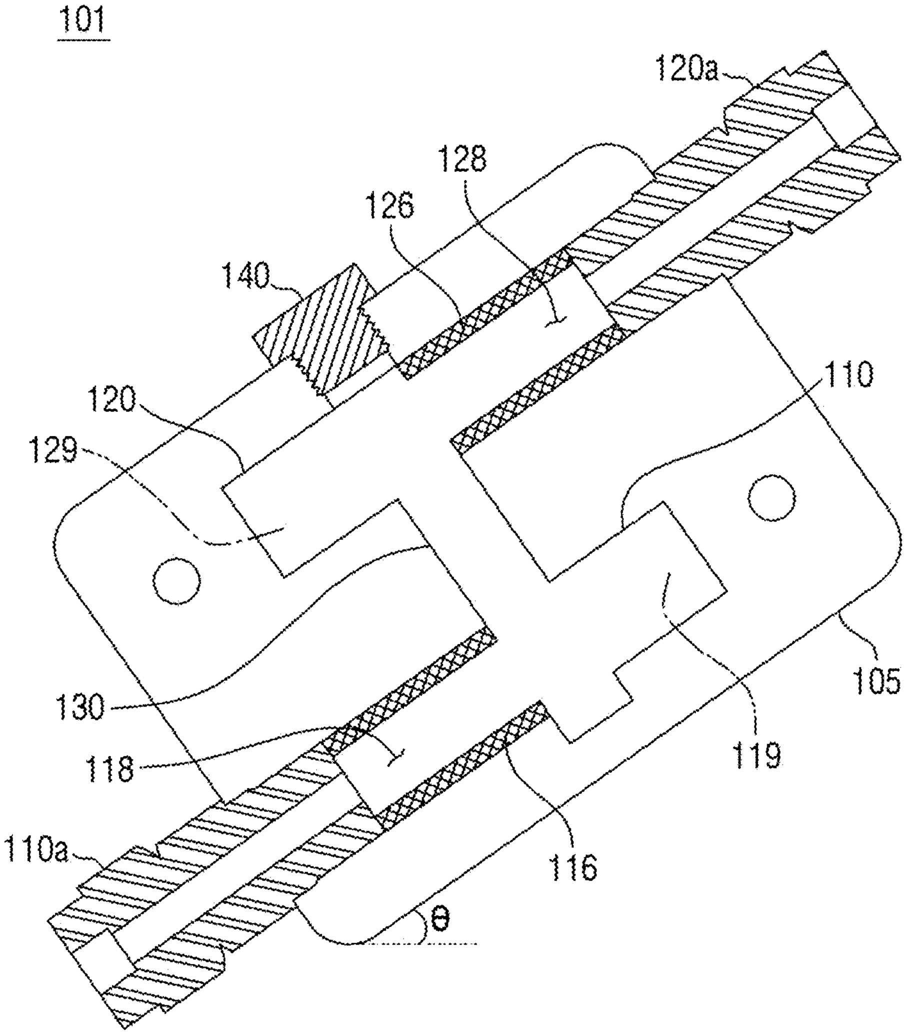
FIG. 5 is a cross-sectional view illustrating the trap unit according to a second embodiment of the present disclosure.

FIG. 5 is a cross-sectional view illustrating the trap unit according to a second embodiment of the present disclosure. Hereinafter, the differences from those described with reference to FIGS. 3 and 4 will be mainly described.

Referring to FIG. 5, in the trap unit 101 according to the second embodiment of the present disclosure, the first trap layer 116 may not be installed on the entire inner wall of the first line 110, but may instead be installed only on a part of the inner wall of the first line 110. The second trap layer 126 may not be installed on the entire inner wall of the second line 120, but may instead be installed only on a part of the inner wall of the second line 120.

Although FIG. 5 illustrates that the first trap layer 116 is installed around the inlet 118 and is not installed in the first buffer region 119, the present disclosure is not limited thereto. For example, the first trap layer 116 may not be installed around the inlet 118, but may be installed in the first buffer region 119.

Although FIG. 5 illustrates that the second trap layer 126 is installed around the outlet 128 and is not installed in the second buffer region 129, the present disclosure is not limited thereto. For example, the second trap layer 126 may not be installed around the outlet 128, but may be installed in the second buffer region 129.

Even if the trap layers 116 and 126 are installed only on a part of the first line 110 and the second line 120, the mist may be liquefied as it passes through a long path.

Figure 6:
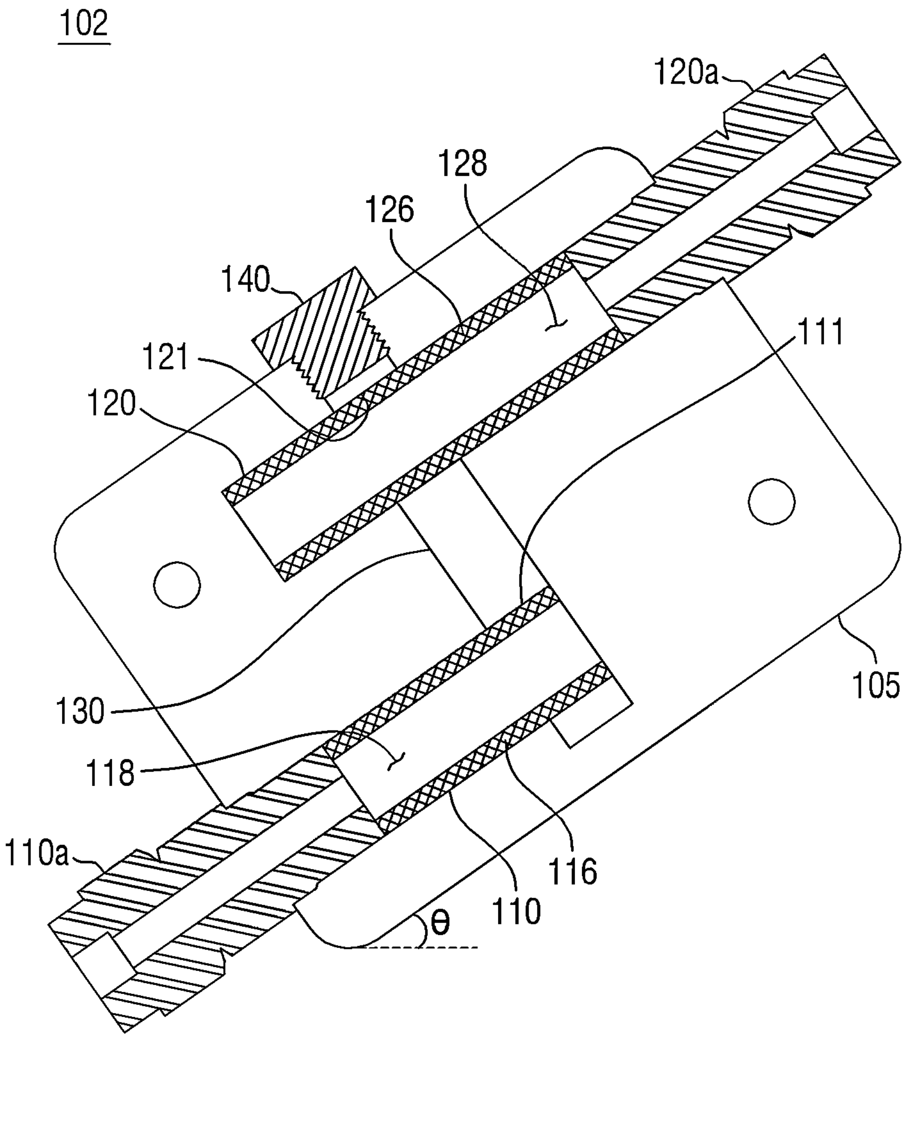
FIG. 6 is a cross-sectional view illustrating the trap unit according to a third embodiment of the present disclosure.
Figure 7:
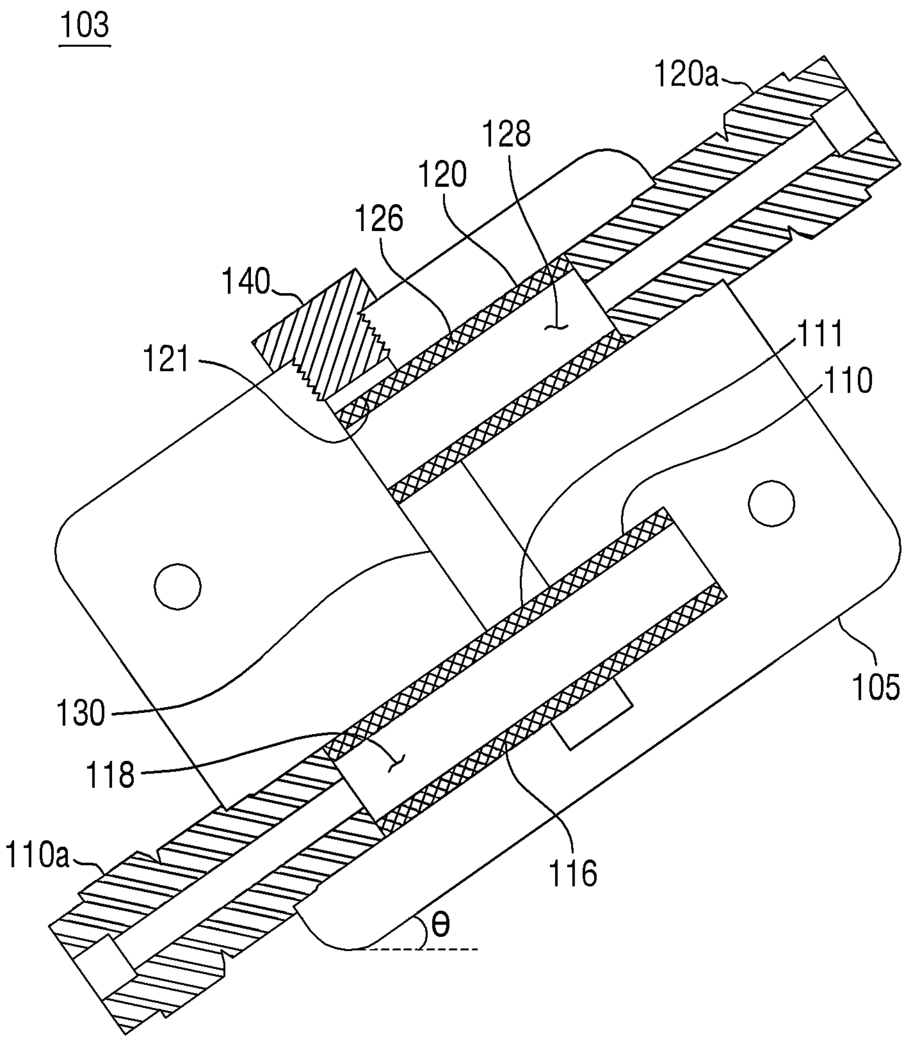
FIG. 7 is a cross-sectional view illustrating the trap unit according to a fourth embodiment of the present disclosure.

FIG. 6 is a cross-sectional view illustrating the trap unit according to a third embodiment of the present disclosure. FIG. 7 is a cross-sectional view illustrating the trap unit according to a fourth embodiment of the present disclosure. Hereinafter, the differences from those described with reference to FIGS. 3 to 5 will be mainly described.

Referring to FIG. 6, unlike the trap unit 100 according to the first embodiment, the trap unit 102 according to the third embodiment of the present disclosure may not be provided with the first buffer region (see 119 of FIG. 3). Referring to FIG. 7, unlike the trap unit 100 according to the first embodiment, the trap unit 103 according to the fourth embodiment of the present disclosure may not be provided with the second buffer region (see 129 of FIG. 3).

Figure 8:
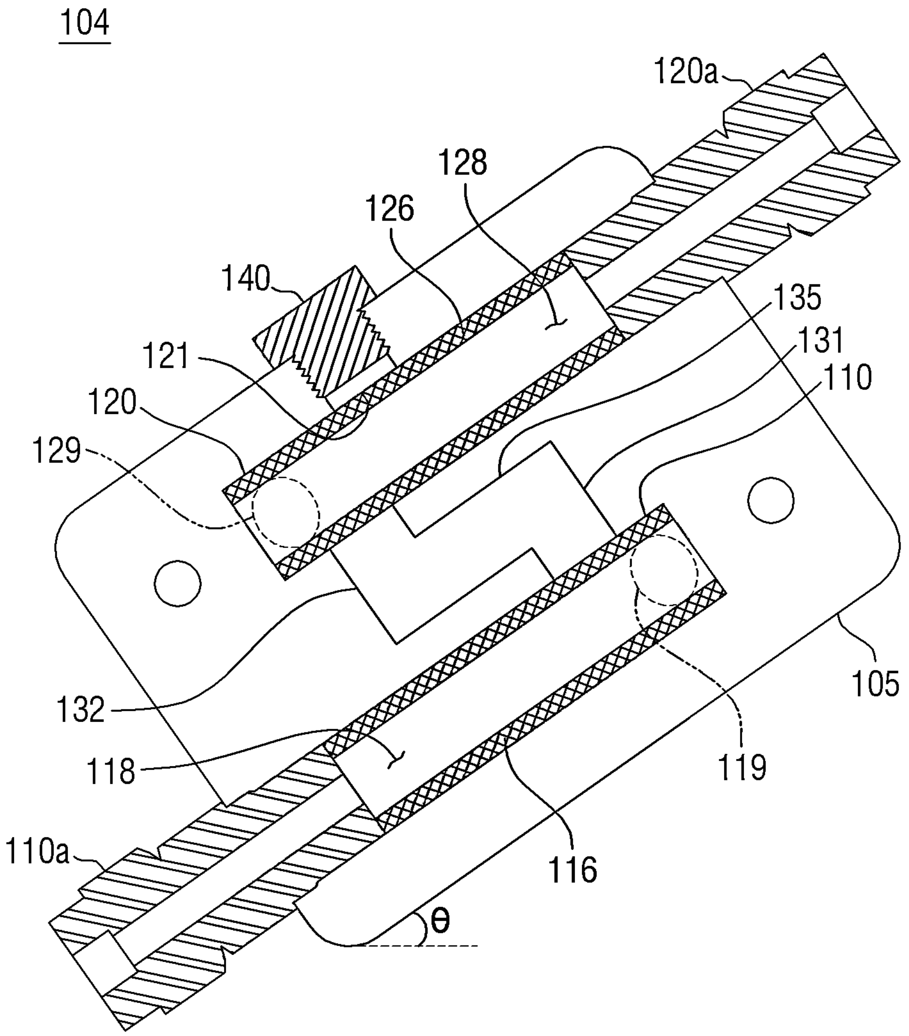
FIG. 8 is a cross-sectional view illustrating a trap unit according to a fifth embodiment of the present disclosure.

FIG. 8 is a cross-sectional view illustrating a trap unit according to a fifth embodiment of the present disclosure. Hereinafter, the differences from those described with reference to FIGS. 3 and 4 will be mainly described.

Referring to FIG. 8, third lines 131, 132 and 135 of a trap unit 104 according to the fifth embodiment of the present disclosure have a path longer than that of the third line 130 illustrated in FIG. 3.

For example, the first line 110 and the second line 120 may be parallel to each other, and the third line 131, 132 and 135 may include an intermediate line 135, a first vertical line 131, and a second vertical line 132. The intermediate line 135 is disposed between the first line 110 and the second line 120 and is parallel to the first line 110 and the second line 120. The first vertical line 131 connects the intermediate line 135 to the first line 110. The second vertical line 132 connects the intermediate line 135 to the second line 120.

The mist inserted into the inlet 118 may reach the outlet 128 only when it passes through the first line 110, the first vertical line 131, the intermediate line 135, the second vertical line 132, and the second line 120. In other words, since an internal path of the trap unit 100 is significantly longer, the mist is liquefied as it passes through the internal path and does not reach the interlock sensor 232 or the pressure control unit 230.

Figure 9:
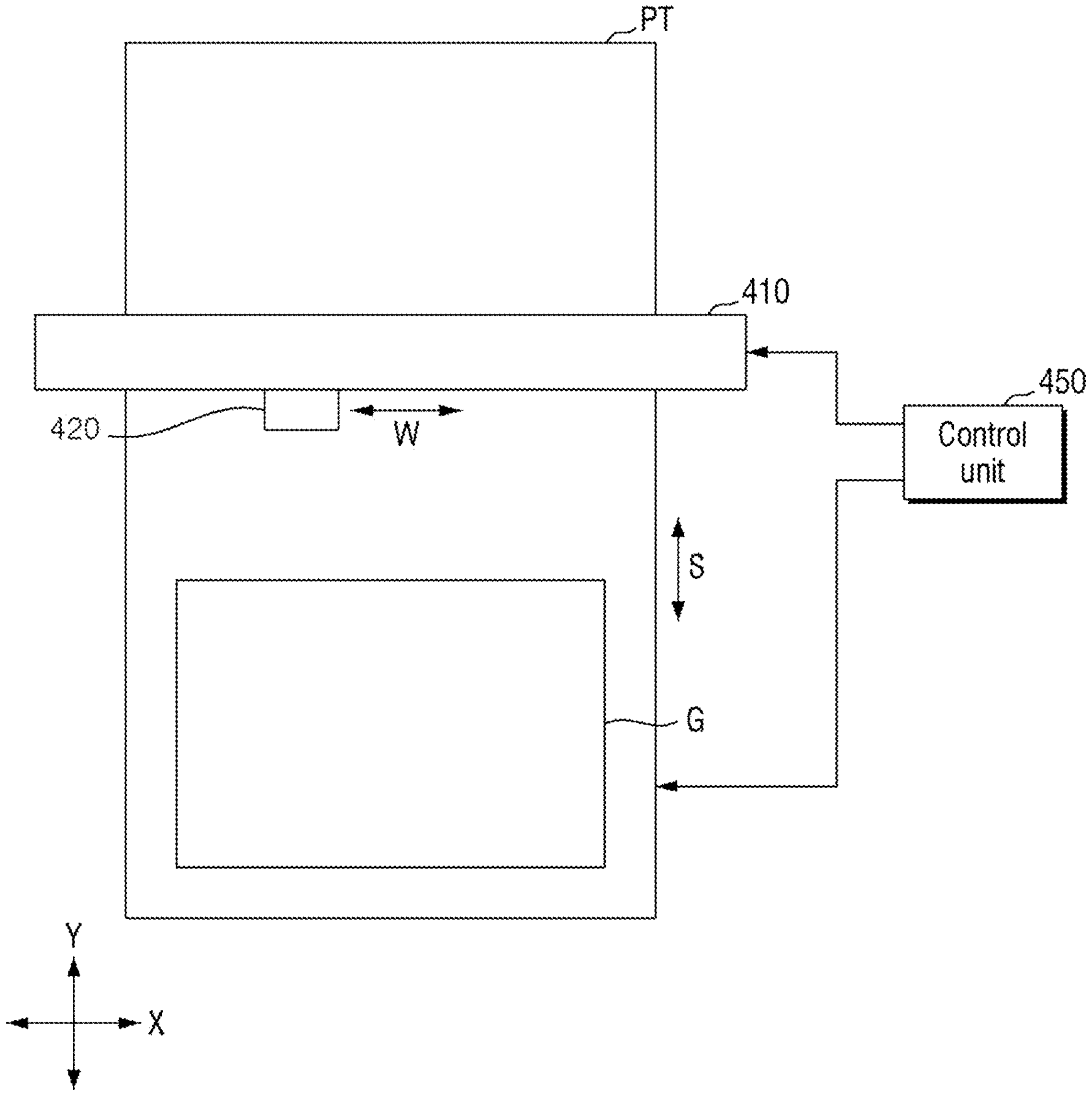
FIG. 9 is an exemplary diagram illustrating a facility to which the substrate processing apparatus according to some embodiments of the present disclosure is applied.

FIG. 9 is an exemplary diagram illustrating a facility to which the substrate processing apparatus according to some embodiments of the present disclosure is applied.

Referring to FIG. 9, the facility includes a stage PT, a gantry 410, an inkjet head module 420, and a control unit 450.

The stage PT may extend long in a first direction Y, and the stage PT may move a substrate Gin the first direction Y (see reference mark S). For example, a plurality of holes are formed in the stage PT, and gas may come out through the holes to levitate a manufacturing substrate. In a state where the manufacturing substrate is levitated, a holder may hold and move the substrate, but the present disclosure is not limited thereto.

The gantry 410 is disposed on the stage PT. The gantry 410 is disposed to cross the stage PT. The gantry 410 is disposed to extend in a second direction X different from the first direction Y.

The inkjet head module 420 may be installed in the gantry 410 and may move in the second direction X along the gantry 410 (see reference numeral W). The inkjet head module 420 corresponds to the apparatus 1 described with reference to FIGS. 1 to 8.

In other words, the inkjet head module 420 includes the head unit configured to discharge the ink, the reservoir configured to store the ink and supply the medical fluid to the head unit, the pressure control unit configured to control the pressure in the reservoir, and the trap unit disposed between the reservoir and the pressure control unit to trap the mist generated in the reservoir.

Herein, the trap unit may include the body, the first line installed in the body, connected to the reservoir and extending in the first direction, the second line installed in the body, connected to the pressure control unit and extending in the second direction, the third line installed to penetrate the first line and the second line from the upper surface of the body, and a trap layer installed on the inner wall of the first line or the inner wall of the second line and configured to trap the mist. Herein, the body is inclined at the acute angle with respect to the upper surface of the reservoir.

The first line includes the first connector connected to the third line, and the first line further includes the inlet disposed in the first side centered on the first connector, and the first buffer region disposed in the second side centered thereon. The second line includes the second connector connected to the third line, and the second line further includes the outlet disposed in the second side centered on the second connector, and the second buffer region disposed in the first side centered thereon.

In addition, while the substrate G on the stage PT moves in the first direction Y (i.e., a swathing operation), the inkjet head module 420 may discharge droplets onto the substrate G while moving in the second direction X.

The control unit 450 controls the stage PT, the inkjet head module 420 and so forth. The control unit 450 is connected to a memory (not shown), and instructions for operating the stage PT, the inkjet head module 420 and so forth are stored in the memory.

Figure 10:
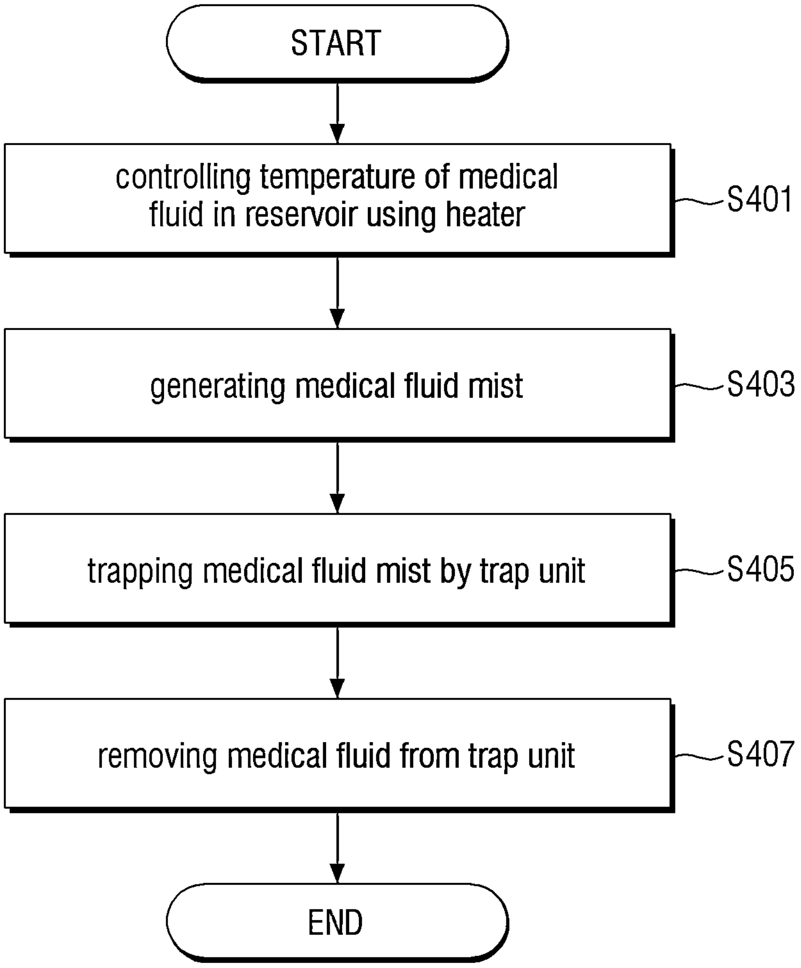
FIG. 10 is a flowchart illustrating the substrate processing method according to some embodiments of the present disclosure.

FIG. 10 is a flowchart illustrating the substrate processing method according to some embodiments of the present disclosure.

Referring to FIGS. 1 to 3 and 10, the substrate processing apparatus 1 including the head unit 210, the supply reservoir 220, the pressure control unit 230, and the trap unit 100.

Furthermore, the temperature of the medical fluid in the supply reservoir 220 is controlled using the heater 222 installed in the supply reservoir 220 (S401).

The mist (i.e., medical fluid mist or vaporized medical fluid) is generated by the heating operation of the heater 222 (S403).

Furthermore, the mist generated in the supply reservoir 220 is delivered to the trap unit 100 through the tube 229. The mist is liquefied while moving along the path in the trap unit 100. In other words, the mist may be liquefied by the trap layers 116 and 126 and/or the long movement path (i.e., the first line 110, the second line 120 or the third line 130). The liquefied medical fluid returns to the supply reservoir 220 along the tube 229 or is trapped in the trap unit 100 (S405).

Then, the medical fluid remaining in the trap unit 100 is removed (S407). When the cover 140 that seals one side of the third line 130 is opened, one side of the third line 130 extending to the upper surface of the body 105 is opened. Accordingly, the medical fluid remaining in the trap unit 100 may be extracted via the third line 130 extending to the upper surface of the body 105.

Although the embodiments of the present disclosure have been described above with reference to the accompanying drawings, the present disclosure is not limited to the disclosed embodiments, but may be implemented in various different ways, and the present disclosure may be embodied in many different forms without changing technical subject matters and essential features as will be understood by those skilled in the art. Therefore, embodiments set forth herein are exemplary only and not to be construed as a limitation.

What is claimed is:

1. A substrate processing apparatus, comprising:

a head unit configured to discharge a medical fluid;

a reservoir configured to store the medical fluid and supply the medical fluid to the head unit;

a pressure control unit configured to control pressure in the reservoir; and a trap unit disposed between the reservoir and the pressure control unit and configured to trap a mist generated by the reservoir, wherein the trap unit comprises;

a body, a first line installed in the body, connected to the reservoir and extending in a first direction, a second line installed in the body, connected to the pressure control unit and extending in a second direction, a third line installed from an upper surface of the body to penetrate the first line and the second line, a trap layer configured to trap the mist is installed on an inner wall of the first line or an inner wall of the second line, and a cover installed on the upper surface of the body to open or seal one side of the third line.

2. The substrate processing apparatus of claim 1, wherein the trap layer includes at least one of a mesh structure, a membrane structure and a filter structure.

3. The substrate processing apparatus of claim 1, wherein the body is inclined at an acute angle with respect to an upper surface of the reservoir.

4. The substrate processing apparatus of claim 1, wherein the first line includes a first connector connected to the third line, and the first line further includes an inlet disposed in a first side centered on the first connector and a first buffer region disposed in a second side centered on the first connector.

5. The substrate processing apparatus of claim 1, wherein the second line includes a second connector connected to the third line, and the second line further includes an outlet disposed in a second side centered on the second connector and a second buffer region disposed in a first side centered on the second connector.

6. The substrate processing apparatus of claim 1, wherein the first line and the second line are parallel to each other, and the third line comprises:

an intermediate line disposed between the first line and the second line and parallel to the first line and the second line;

a first vertical line configured to connect the intermediate line and the first line; and a second vertical line configured to connect the intermediate line and the second line.

7. The substrate processing apparatus of claim 1, wherein a heater configured to control the temperature of the medical fluid is installed in the reservoir.

8. The substrate processing apparatus of claim 1, wherein an interlock sensor is installed in a tube configured to connect the trap unit and the pressure control unit.

9. The substrate processing apparatus of claim 1, wherein the trap unit is positioned below an interlock sensor configured to detect liquid.

* * * * *